United States Patent
Schuhmacher et al.

(10) Patent No.: US 11,424,480 B2
(45) Date of Patent: Aug. 23, 2022

(54) LITHIUM-ION-CONDUCTING COMPOSITE MATERIAL AND PROCESS FOR PRODUCING

(71) Applicant: SCHOTT AG, Mainz (DE)

(72) Inventors: Jörg Schuhmacher, Kornwestheim (DE); Philipp Treis, Mainz (DE); Jochen Drewke, Mainz (DE); Hans-Joachim Schmitt, Ockenheim (DE); Rolf Samsinger, Rüsselsheim (DE); Andreas Roters, Mainz (DE); Meike Schneider, Taunusstein (DE); Yvonne Menke-Berg, Wiesbaden (DE)

(73) Assignee: SCHOTT AG, Mainz (DE)

(*) Notice: Subject to any disclaimer, the term of this patent is extended or adjusted under 35 U.S.C. 154(b) by 59 days.

(21) Appl. No.: 16/208,642

(22) Filed: Dec. 4, 2018

(65) Prior Publication Data
US 2019/0173130 A1 Jun. 6, 2019

(30) Foreign Application Priority Data
Dec. 4, 2017 (DE) .......................... 102017128719.1

(51) Int. Cl.
| | | |
|---|---|---|
| *H01M 10/0565* | (2010.01) | |
| *C03C 4/18* | (2006.01) | |
| *C03C 10/00* | (2006.01) | |
| *H01M 10/0525* | (2010.01) | |
| *H01M 10/052* | (2010.01) | |

(52) U.S. Cl.
CPC ........... *H01M 10/0565* (2013.01); *C03C 4/18* (2013.01); *C03C 10/00* (2013.01); *H01M 10/052* (2013.01); *H01M 10/0525* (2013.01); *H01M 2300/0091* (2013.01)

(58) Field of Classification Search
None
See application file for complete search history.

(56) References Cited

U.S. PATENT DOCUMENTS

| | | |
|---|---|---|
| 3,279,905 A | 10/1966 | Wood |
| 3,495,961 A | 2/1970 | Lange |
| 3,499,745 A | 3/1970 | Plumat |
| 4,043,507 A | 8/1977 | Wace |
| 5,484,559 A | 1/1996 | Johns |
| 5,500,162 A | 3/1996 | Theisen |
| 5,719,225 A | 2/1998 | Hirano |
| 6,030,909 A | 2/2000 | Fu |
| 6,187,700 B1 | 2/2001 | Merkel |
| 6,197,073 B1 | 3/2001 | Kadner |
| 6,209,352 B1 | 4/2001 | Beall |
| 6,475,678 B1 | 11/2002 | Suzuki |
| 6,485,622 B1 | 11/2002 | Fu |
| 6,506,699 B1 | 1/2003 | Shindo |
| 2003/0187117 A1 | 10/2003 | Starkovich |
| 2003/0205467 A1 | 11/2003 | Fu |
| 2004/0007789 A1 | 1/2004 | Vlach |
| 2004/0077481 A1 | 4/2004 | Remke |
| 2004/0196887 A1 | 10/2004 | Schmidbauer |
| 2005/0107239 A1 | 5/2005 | Akiba |
| 2008/0012156 A1 | 1/2008 | Papathomas |
| 2009/0011339 A1 | 1/2009 | Seino |
| 2009/0159839 A1 | 6/2009 | Seino |
| 2009/0189507 A1 | 7/2009 | Winkler |
| 2010/0047696 A1 | 2/2010 | Yoshida |
| 2010/0203383 A1 | 8/2010 | Weppner |
| 2011/0053001 A1 | 3/2011 | Babic |
| 2011/0140289 A1 | 6/2011 | Shiobara |
| 2014/0057162 A1 | 2/2014 | Schneider |
| 2016/0168038 A1 | 6/2016 | Mueller |
| 2016/0185652 A1 | 6/2016 | Li |
| 2017/0005367 A1 | 1/2017 | Van Berkel |
| 2017/0229731 A1* | 8/2017 | Visco .................. H01M 4/1395 |
| 2017/0334327 A1 | 11/2017 | Diefenthaler |
| 2017/0358825 A1* | 12/2017 | Yoshima ........... H01M 10/0525 |
| 2018/0241076 A1* | 8/2018 | Nishiura ............. H01M 10/052 |

FOREIGN PATENT DOCUMENTS

| | | |
|---|---|---|
| DE | 282675 | 9/1990 |
| DE | 19939782 | 5/2001 |
| DE | 10111938 | 9/2002 |
| DE | 102006027133 | 12/2007 |

(Continued)

OTHER PUBLICATIONS

Hayashi, "High lithium ion conduction of sulfide glass-based solid electrolytes and their application to all-solid-state batteries", Journal of non-Crystalline Solids, 355, (2009), pp. 1919-1923.

(Continued)

*Primary Examiner* — Carmen V Lyles-Irving
(74) *Attorney, Agent, or Firm* — Ruggiero McAllister & McMahon LLC

(57) ABSTRACT

A lithium-ion-conducting composite material and process of producing are provided. The composite material includes at least one polymer and lithium-ion-conducting particles. The particles have a sphericity $\Psi$ of at least 0.7. The composite material includes at least 20 vol % of the particles for a polydispersity index PI of the particle size distribution of <0.7 or are present in at least 30 vol % of the composite material for the polydispersity index in a range from 0.7 to <1.2, or are present in at least 40 vol % of the composite material for the polydispersity index of >1.2.

8 Claims, No Drawings

(56) References Cited

FOREIGN PATENT DOCUMENTS

| | | |
|---|---|---|
| DE | 102006039462 | 3/2008 |
| DE | 102007030604 | 1/2009 |
| DE | 102013101145 | 8/2014 |
| DE | 102013224045 | 5/2015 |
| DE | 102014220457 | 4/2016 |
| DE | 102014116378 | 5/2016 |
| DE | 102015107819 | 6/2016 |
| DE | 102016208532 | 11/2017 |
| DE | 102016208533 | 11/2017 |
| EP | 1135343 | 7/2003 |
| EP | 1927394 | 6/2008 |
| EP | 3360848 | 8/2018 |
| JP | 3062203 | 7/2000 |
| JP | 2008047412 | 2/2008 |
| JP | 2008120666 | 5/2008 |
| KR | 1020140080183 | 6/2014 |
| WO | 0020345 | 4/2000 |
| WO | 2015014930 | 2/2015 |

OTHER PUBLICATIONS

Seino, "Synthesis and electrochemical properties of $Li_2S$—$B_2S_3$—$Li_4SiO_4$", Solid State Ionics, 177, (2006) pp. 2601-2603.

Xu, "Preparation and characterization of lithium ion-conducting glass-ceramics in the $Li_{1+x}Cr_xGe_{2x}(PO_4)_3$ system", Electrochem. Commun., 6, (2004), pp. 1233-1237.

Xu et al., "High lithium conductivity in $Li_{1.3}Cr_{0.3}Ge_{1.7}(PO_4)_3$ glass-ceramics", Materials Letters, 58, (2004), pp. 3428-3431.

Nagamine, "Lithium ion conductive glass-ceramics with $Li_3Fe_2(PO_4)_3$ and YAG laser-induced local crystallization in lithium iron phosphate glasses", Solid State Ionics, 179, (2008), pp. 508-515.

Shimonishi, "Synthesis of garnet-type $Li_{7-x}La_3Zr_2O_{12}-1/2x$ and its stability in aqueous solutions", Solid State Ionics, 183, (2011), pp. 48-53.

\* cited by examiner

LITHIUM-ION-CONDUCTING COMPOSITE MATERIAL AND PROCESS FOR PRODUCING

CROSS REFERENCE TO RELATED APPLICATIONS

This application claims the benefit under 35 USC § 119 of German Application No. 102017128719.1 filed Dec. 4, 2017, the entire contents of which are incorporated herein by reference.

BACKGROUND

1. Field of the Invention

The invention relates to a lithium-ion-conducting composite material comprising at least one polymer and lithium-ion-conducting particles and to a process for producing a lithium ion conductor from the composite material.

2. Description of Related Art

Over recent years, lithium-ion batteries and lithium batteries have acquired ever greater importance, especially for electronic devices, but also in the field of electric vehicles, for reasons in particular of their high energy densities, the absence of memory effects, and the very slow rate at which they suffer voltage drop. Lithium-ion batteries and lithium batteries in general comprise a family of rechargeable batteries (also referred to as secondary batteries) which are used as power storage media for the fields identified above.

A lithium-ion battery or lithium battery consists fundamentally of three main structural units, these being the anode (negative electrode), the cathode (positive electrode) and the non-aqueous electrolyte, which is disposed between the two electrodes and which brings about the movement of the lithium ions in operation (charging or discharge). In the case of the lithium-ion batteries, the anode is customarily graphite-based, with lithium ions being intercalated into this anode during charging and given up from this anode on discharge. In the case of the lithium batteries, conversely, the anode used comprises elemental lithium.

At present, the lithium-ion batteries that are available commercially use primarily electrolytes in which a lithium salt is in solution in an organic solvent. A disadvantage of these lithium-ion batteries, however, is that in the case of misuse or under extreme loads, they may self-destruct and, in the most extreme case, may catch fire when they do.

In order to solve these problems, a particular focus of investigation in recent years has been that of what are called solid-state lithium batteries, in which the liquid, organically based electrolyte matrix is replaced by a solid, which is still lithium-conductive. In this case, very generally, the solid-state electrolyte in the battery system can be used at various locations: on the one hand, a conceivable use of the pure solid-state electrolyte is as a separator—introduced between the electrodes, it preserves them from unwanted short-circuiting and so secures the functional capacity of the system as a whole. For this purpose, the solid-state electrolyte may either be applied as a layer to one or both electrodes, or integrated as a free-standing membrane into the battery. Also conceivable is for the solid-state electrode to be compounded with the active electrode materials. In that case, the electrolyte brings about the transport of the relevant charge carries (lithium ions and electrons) to the electrode materials and to or away from the conducting electrodes, according to whether the battery is being discharged or charged.

In principle, solid-state electrolytes may comprise a polymer electrolyte or a polyelectrolyte. In the case of the former—similarly to the liquid electrolytes—a lithium-based conductive salt is in solution in a solid polymer matrix (for which purpose polyethylene oxide is frequently employed). In the second case, the systems in question are polyfunctional lithium salts of a polymer. Both electrolytes—polymer electrolytes and polyelectrolytes—are similar to the liquid-based electrolytes in having, in general, insufficient chemical and electrochemical stability with respect to elemental lithium, and are therefore less suitable for use in lithium batteries. Alternatively, however, it is also possible to conceive of using a purely inorganic solid-state ion conductor as replacement for the organically based liquid electrolytes that have been used to date. Particularly promising in this context with regard to their lithium-ion conductivity are oxide-based (e.g. lithium-conducting mixed oxides with garnet-like structure), phosphate-based and sulfide-based materials that conduct lithium ions. Certain variants of these have sufficient chemical and electrochemical stability with respect to elemental lithium. They are therefore suitable for use in lithium batteries. For other representatives of the class of the purely inorganic solid-state ion conductors, however, this is not the case. The possibility of deploying such a material as a solid-state electrolyte in lithium batteries must therefore be examined separately again in each individual case. A third variant of a lithium-conducting solid is represented by what are called the hybrid electrolytes: these comprise a composite material wherein particles of an inorganic, lithium-ion-conducting material are incorporated into a lithium-conducting polymer matrix consisting of a polymer electrolyte or polyelectrolyte. Certain hybrid electrolyte variants likewise display sufficient chemical and electrochemical stability with respect to elemental lithium and so likewise possess the potential for use in lithium batteries.

Among the purely inorganic solid electrolytes that conduct lithium ions, the sulfidic compositions Li—S—P and $Li_2S$—$P_2S_5$—$P_2O_5$ are sometimes prepared by grinding of the reactants under inert gas and by subsequent temperature treatment (generally likewise under inert gas). The production of Li—P—S glass-ceramics is described in the texts US 20050107239 A1, US 2009159839 A and JP 2008120666 A. $Li_2S$—$P_2S_5$—$P_2O_5$ may be prepared—as by A. Hayashi et al., Journal of non-Crystalline Solids 355 (2009) 1919-1923—either via a grinding operation or else via the melt. Glass-ceramics composed of the system $Li_2S$—$B_2S_3$—$Li_4SiO_4$ as well may be produced via the melting route with subsequent quenching, although these operations as well should be conducted in the absence of air (see US 2009011339 A and Y. Seino et al., Solid State Ionics 177 (2006) 2601-2603). The attainable lithium-ion conductivities are from $2 \times 10^{-4}$ to $6 \times 10^{-3}$ S/cm at room temperature. To be borne in mind in the case of the sulfidic solid electrolytes that conduct lithium ions is the fact that production under inert gas and the sometimes complicated grinding operations may make them more expensive to produce. Handling and storage as well, moreover, frequently have to be done under inert gas, or at least in a water-free environment, something which under certain circumstances may be a disadvantage for the production of the lithium batteries.

Conversely, the solid-state lithium-ion conductors that are based on oxidic systems feature simpler and hence more favourable production and greater chemical stability. Known representatives include primarily phosphate-based compositions with crystal phases which have a crystal structure similar to NASICON (sodium super-ionic conductor). Customarily these are glass-ceramics, in which case first of all a starting glass is melted and subjected to hot shaping (e.g. casting). The starting glass, in a second step, is ceramicized either directly ("bulk glass-ceramic") or as a powder ("sintered glass-ceramic"). Ceramicization, through an appropriately selected temperature-time regime, may involve a controlled crystallization, permitting the establishment of a glass-ceramic structure optimized for lithium-ion conductivity. As a result it is possible to achieve an improvement in the conductivity of the order of magnitude of more than one factor of ten. The text US 20030205467 A1 describes the production of glass-ceramics from $P_2O_5$, $TiO_2$, $SiO_2$, $M_2O_3$ (M=Al or Ga) and $Li_2O$, with the main crystal phase $Li_{(1+x)}(Al, Ga)_xTi_{(2-x)}(PO_4)_3$ (0<x≤0.8). After crystallization, an ion conductivity of 0.6 to $1.5 \times 10^{-3}$ S/cm was achieved. The starting glasses are very susceptible to crystallization and must be quenched on a metal plate in order to prevent uncontrolled crystallization. This limits the possibilities for shaping and for establishment of structure in the glass-ceramic.

In the texts U.S. Pat. Nos. 6,030,909 and 6,485,622, $GeO_2$ and $ZrO_2$ are additionally introduced into the glass-ceramic. $GeO_2$ enlarges the glass-forming range and reduces the crystallization tendency. In practice, however, this positive effect is limited by the high price of the germanium raw material. $ZrO_2$, in contrast, leads to an intensification of the crystallization. The starting glasses identified in these texts also tend towards uncontrolled crystallization and must generally be quenched in order to give a suitable starting glass.

In Electrochem. Commun., 6 (2004) 1233-1237, and in Materials Letters, 58 (2004), 3428-3431, Xu et al. describe $Li_2O$—$Cr_2O_3$—$P_2O_5$ glass-ceramics which likewise have high conductivities of $5.7 \times 10^{-4}$ to $6.8 \times 10^{-4}$ S/cm. These starting glasses as well, however, have to be quenched, owing to a strong tendency to crystallize.

There are also descriptions of glass-ceramics which contain $Fe_2O_3$ (K. Nagamine et al., Solid State Ionics, 179 (2008) 508-515). Here, ion conductivities of $3 \times 10^{-6}$ S/cm were found. However, the use of ion (or other polyvalent elements) frequently leads to the occurrence of electronic conductivity, which must be avoided in a solid-state electrolyte. In accordance with JP 2008047412 A, therefore, this glass-ceramic is used preferably as a cathode material, where electronic conductivity is desirable in order to facilitate the contacting of the cathode.

US 2014/0057162 A1 describes lithium-ion-containing phosphate-based glass-ceramics which exhibit an ion conductivity of at least $5 \times 10^{-7}$ S/cm and feature starting glasses which have sufficient crystallization stability, allowing them to be produced from the melt by casting without the need for quenching. Both the glass-ceramics and the starting glasses also have sufficient chemical stability in air, permitting storage. The reason why this is possible is that the corresponding phosphate-based glass-ceramics comprise $Ta_2O_5$ and/or $Nb_2O_5$. $Ta_2O_5$ and $Nb_2O_5$ improve the crystallization stability of the glass and, owing to the fact that they can likewise be incorporated into the crystal phase, have a positive influence on the ion conductivity, by raising the crystal-phase fraction.

A class of substance which, among the oxide-based, inorganic, solid-state ion conductors, is of particular interest on account of their high lithium-ion conductivity is that of lithium-containing mixed oxides with a garnet-like structure, as described in the text DE 102007030604 A1. Particularly high conductivity in this context is possessed by the class of materials with zirconium and lanthanum that in their simplest form have the formula $Li_7La_3Zr_2O_{12}$. The latter compound or compounds derived from it is frequently also referred to for short simply as LLZO. This garnet occurs in two modifications, a tetragonal and a cubic modification. Since in particular the cubic modification of LLZO has a high lithium-ion conductivity, the cubic modification of LLZO is of particular interest for solid-state lithium batteries. Further investigations on LLZO have shown that the formation of the cubic modification of LLZO can be stabilized in particular with addition of further metals for doping, such as aluminium, for example. For the purposes of the present specification, lithium lanthanum zirconium oxides, undoped or doped, or compounds derived therefrom, are referred to generally as LLZO. In the past, LLZOs have proven to be chemically and electrochemically stable with respect to the elemental lithium employed as anode in lithium batteries, and so possess a great potential for use as an electrolyte in corresponding systems.

The literature gives a number of methods for preparing LLZO. For instance, on the one hand, "solid-phase" processes are known for the preparation of LLZO, as are described in US 2010/047696 A1 or in US 2010/0203383 A1, for example. In the process described in the latter document, the starting materials, previously dried in some cases at temperatures up to 900° C., are ground for 12 hours in a ball mill, then heated for 12 hours at temperatures between 900 and 1125° C.; the product obtained is then ground again in a ball mill. After that, the resulting powder is subjected to isostatic pressing and calcined again at temperatures in the region of 1230° C. for 36 hours. Alternatively to the solid-phase processes, attempts have been made to prepare precursors, using the sol-gel process which can then be processed further to form the desired crystalline mixed oxides with garnet structure. One process of this kind, sometimes also described as the Pechini process, is described in Y. Shimonishi et al, Solid State Ionics 183 (2011) 48-53, for example. In this case, lithium, lanthanum and zirconium are used in the form of the nitrates and are heated together in a mixture of water, citric acid and ethylene glycol, to form a black solid, which must then be heat-treated at 350° C. for five hours, before an intermediate in powder form is obtained which can then be processed further to the desired end product. DE 102013101145 A1 and DE 102013224045 A1 describe the production of cubically or tetragonally crystallizing LLZO via the sol-gel process, starting in one case from an alcohol-based sol and in the other case from a water-based sol. US 2011/0053001 A1 discloses a further sol-gel process for producing amorphous LLZO.

DE 102014116378 A1 discloses the production of LLZO in the form of a glass-ceramic. A glass-ceramic refers—as described above in the case of the phosphate-based solid-state lithium-ion conductors—to a material which is produced by melt technology and converted subsequently into a glass-ceramic. The glass-ceramic contains an amorphous fraction of at least 5 wt %. The amorphous fraction has a positive influence on the conductivity. However, the fraction of the amorphous phase ought not to be greater than 40 wt %, preferably less than or equal to 30 wt %, since otherwise the overall conductivity is reduced. A further advantage of production in the form of a glass-ceramic lies in the possibility of exerting a direct influence over the microstructure through controlled crystallization, thereby enabling further positive influencing of the conductivity. The glass-ceramic described in DE 102014116378 A1 preferably has an ion conductivity of at least $5 \times 10^{-5}$ S/cm, more preferably at least $1 \times 10^{-4}$ S/cm. In some cases the ion conductivity may even be considerably higher still.

SUMMARY

It is an object of the present invention to provide a lithium-ion-conducting composite material comprising at least one polymer and lithium-ion-conducting particles, where the composite material is to have a substantially higher particle fill level than has hitherto been achievable. The material is to be simpler and more economical to produce. A further object of the invention is to find a process for producing a lithium-ion conductor from the composite material.

The object is achieved by means of a lithium-ion-conducting composite material, comprising at least one polymer and lithium-ion-containing particles, where the particles have a sphericity $\Psi$ of at least 0.7 and where the composite material comprises at least 20 vol % of the particles for a polydispersity index PI of the particle size distribution of <0.7, or where the composite material comprises at least 30 vol % of the particles for a polydispersity index PI of the particle size distribution in the range from 0.7 to <1.2, or where the composite material comprises at least 40 vol % of the particles for a polydispersity index PI of the particle size distribution of >1.2.

The sphericity $\Psi$ here is a parameter of how sphere-shaped the particle is.

According to the definition of H. Wadell, the sphericity $\Psi$ of a particle is calculated as the ratio of the surface area of a sphere of equal volume to the surface area of the particle:

$$\Psi = \frac{\sqrt[3]{36\pi V_p^2}}{A_p}$$

where $V_p$ denotes the volume of the particle and $A_p$ its surface area.

Typical sphericity values $\Psi$ for different types of particle are as follows:
Sphere: 1.0
Drop, bubble, round grain: 0.7-1.0
Angular grain: 0.45-0.6
Needle-shaped particle: 0.2-0.45
Platelet-shaped particle: 0.06-0.16
Particle with severely riven surface: $10^{-8}$-$10^{-4}$ High sphericities $\Psi$ in the sense of the present invention are achieved when $\Psi$ has a value of at least 0.7.

By the polydispersity index, PI, of the particle size distribution is meant, in the sense of the invention, the base-ten logarithm of the quotient formed from the $d_{90}$ and the $d_{10}$ values of the distribution:

$$PI = \log(d_{90}/d_{10})$$

Generally speaking, higher particle fill levels can be achieved in composites and composite precursors for broader particle size distributions, in other words if the polydispersity index PI adopts larger values.

Definition of d, Especially $d_{90}$ Values and $d_{10}$, for Determining PI:

Independently of their sphericity $\Psi$, the particles of a powder are generally distinguished with the aid of a volume-equivalent sphere diameter, which has to be measured, and are ordered into selected classes according to their size. To represent a particle size distribution, a determination is made of the quantity fractions with which the respective classes of particle are present in the powder.

This is done using different quantity types. If the particles are counted, the quantity type is the number. In the case of weighings, conversely, it is the mass or, in the case of homogeneous density, the volume. Other types are derived from lengths, projection surfaces and surface areas.

The following are distinguished:

| Quantity type: | Index r: |
|---|---|
| Number | 0 |
| Length | 1 |
| Area | 2 |
| Volume (mass) | 3 |

One common quantity measure for describing the particle size distribution in powders is formed by the cumulative distribution. The index r identifies the quantity type according to the table above.

The cumulative distribution function $Q_r(d)$ indicates the standardized quantity of all particles having an equivalent diameter less than or equal to d. Explicitly defined below are cumulative distributions of the two most commonplace quantity types:

Particle Number (r=0)

Let $N_i$ be the number of all particles investigated with a diameter d less than or equal to the diameter $d_i$ under consideration and let N be the total number of all particles investigated. In that case $$Q_0(d_i) = \frac{N_i}{N}$$

Particle Mass (r=3)

Let $m_i$ be the mass of all particles investigated with a diameter d less than or equal to the diameter $d_i$ under consideration, and let m be the total mass of all particles investigated. In that case $$Q_3(d_i) = \frac{m_i}{m}$$

In the sense of the invention, $d_i$ values are understood to be equivalent diameter values for which the $Q_3(d_i)$ cumulative distribution function adopts the following values:

$d_{10}$: $Q_3(d_{10})=10\%$, i.e. 10 wt % of the particles have a diameter less than or equal to $d_{10}$.
$d_{50}$: $Q_3(d_{50})=50\%$, i.e. 50 wt % of the particles have a diameter less than or equal to $d_{50}$.
$d_{90}$: $Q_3(d_{90})=90\%$, i.e. 90 wt % of the particles have a diameter less than or equal to $d_{90}$.
$d_{99}$: $Q_3(d_{99})=99\%$, i.e. 99 wt % of the particles have a diameter less than or equal to $d_{99}$.
$d_{100}$: $Q_3(d_{100})=100\%$, i.e. 100 wt % of the particles have a diameter less than or equal to $d_{100}$.

In the sense of the present specification, the term "polydispersity index" may be understood synonymously with the term "polydispersion index".

The composite material of the invention may be used a) in one embodiment directly as a lithium-ion conductor or b) in another embodiment as an intermediate for further processing to give a lithium-ion conductor.

Surprisingly it has emerged that with particles having a sphericity $\Psi$ of at least 0.7 it is possible to achieve a substantially higher particle fill level. Accordingly, composite materials of the invention are accessible which comprise at least 20 vol % of the particles when the polydispersity index PI of the particle size distribution has a value of <0.7, or which comprise at least 30 vol % of the particles when the polydispersity index PI of the particle size distribution has a value of $0.7 \leq PI < 1.2$, or which comprise at least 40 vol % of the particles when the polydispersity index PI has a value of $\geq 1.2$.

In one particularly preferred embodiment of the invention, the particles have a sphericity $\Psi$ of at least 0.8 and more preferably of at least 0.9.

In a further embodiment, the composite material preferably comprises at least 25 vol % of the particles and more preferably at least 30 vol % of the particles if the polydispersity index PI of the particle size distribution has a value of <0.7, preferably at least 35 vol % of the particles and more preferably at least 40 vol % of the particles if the polydispersity index PI of the particle size distribution has a value of $0.7 \leq PI < 1.2$, or preferably at least 45 vol % of the particles and more preferably at least 50 vol % of the particles if the polydispersity index PI of the particle size distribution has a value of $\geq 1.2$.

The polymer preferably comprises at least one of the following compounds: polyethylene oxide, derivatives of polyethylene oxide, polyvinyl butyral.

Furthermore, the use of the following polymers is conceivable: polyacrylonitrile, polyester, polypropylene oxide, ethylene oxide/propylene oxide copolymer, polyethylene oxide crosslinked with trifunctional urethane, poly(bis(methoxy-ethoxy-ethoxide))phosphazene (MEEP), triol-like polyethylene oxide crosslinked with difunctional urethane, poly((oligo)oxyethylene) methacrylate-co-alkali metal methacrylate, polymethyl methacrylate (PMMA), polymethylacrylonitrile (PMAN), polysiloxanes and also their copolymers and derivatives, polyvinylidene fluoride or polyvinylidene chloride and also the copolymers and derivatives thereof, poly(chlorotrifluoroethylene), poly(ethylene-chlorotrifluoroethylene), poly(fluorinated ethylene-propylene), acrylate-based polymers, condensed or crosslinked combinations thereof, and/or physical mixtures of these.

The polymer can comprise at least one lithium-ion-conducting compound, more particularly lithium bistrifluoromethanesulfonimidate as lithium-ion-conducting compound.

Further suitable conductive salts that can be used include the following. $LiAsF_6$, $LiClO_4$, $LiSbF_6$, $LiPtCl_6$, $LiAlC_4$, $LiGaCl_4$, LiSCN, $LiAlO_4$, $LiCF_3CF_2SO_3$, $Li(CF_3)SO_3$ (LiTf), $LiC(SO_2CF_3)_3$, phosphate-based lithium salts, preferably $LiPF_6$, $LiPF_3(CF_3)_3$(LiFAP) and $LiPF_4(C_2O_4)$ (LiTFOB), borate-based lithium salts, preferably $LiBF_4$, $LiB(C_2O_4)_2$ (LiBOB), $LiBF_2(C_2O_4)$ (LiDFOB), $LiB(C_2O_4)(C_3O_4)$ (LiMOB), $Li(C_2F_5BF_5)$ (LiFAB) and $Li_2B_{12}F_{12}$ (LiDFB) and/or lithium salts of sulfonylimides, preferably $LiN(FSO_2)_2$ (LFSI), $LiN(SO_2CF_3)_2$ (LiTFSI) and/or $LiN(SO_2C_2F_5)_2$ (LiBETI).

Besides the stated polymer electrolyte it is also possible, alternatively, for a polyelectrolyte to be employed. These are polymers, an example being polystyrenesulfonate (PSS), which carries $Li^+$ as counter-ion, or polymerized imidazolium-, pyridinium-, phosphonium- or guanidinium-based ionic liquids which carry a discrete number of chemically bonded ionic groups and for that reason are intrinsically lithium-ion-conductive.

The lithium-ion-conducting particles consist preferably of at least one lithium-ion-conducting compound, more particularly of at least the following lithium-ion-conducting compounds: lithium lanthanum zirconate (LLZO), lithium aluminium titanium phosphate (LATP) compounds with garnet-like crystal structure, composed more particularly of a material with a garnet-like crystal structure having the empirical formula $Li_{7+x-y} M_x^{II} M_{3-x}^{III} M_{2-y}^{IV} M_y^{V} O_{12}$ where: $M^{II}$ is a divalent cation, $M^{III}$ is a trivalent cation, $M^{IV}$ is a tetravalent cation, and $M^{V}$ is a pentavalent cation, where preferably $0 \leq x < 3$, more preferably $0 \leq x \leq 2$, $0 \leq y < 2$, and very preferably $0 \leq y \leq 1$ or compounds derived therefrom, are more particularly of compounds doped with Al, Nb or Ta, compounds having a crystal structure isostructural with NaSICon, more particularly having the empirical formula $Li_{1+x-y}M^{5+}_y M^{3+}_x M^{4+}_{2-x-y}(PO_4)_3$, where x and y are in the range from 0 to 1 and $(1+x-y)>1$ and M is a cation of valency +3, +4 or +5, or compounds derived therefrom.

The particles preferably have an average particle diameter in the range from 0.02 μm to 100 μm, more preferably in the two ranges 0.2 μm to 2 μm and 5 μm to 70 μm, and more preferably in one of the two ranges 0.2 μm to 2 μm or 5 μm to 70 μm.

In a further preferred embodiment, for the lithium-ion-conducting composite material, the interfacial resistance for the lithium-ion conductivity between the polymer and the particles is reduced as a result of a surface modification of the particles and therefore the lithium-ion conductivity is greater than for a comparable composite material wherein the interfacial resistance between the polymer and the particles is not reduced.

The particles have preferably been produced by means of at least one of the following processes: spray calcination (especially using the pulsation reactor technology), filamentization from a salt melt, droplet formation, and glass sphere production.

Irrespective of the issue whether the purely inorganic solid-state lithium-ion conductors are oxide-based, phosphate-based or sulfide-based, a feature common to all of the methods described to date in the prior art for producing them is that the lithium-ion-conducting material obtained in the process in question is obtained either monolithically or else at least in indefinitely coarse-grained structure, and must be brought into a final presentation form, as a powder with defined particle size and particle size distribution, by means of further size-reduction steps, generally fine grinding processes. The target particle size is frequently in the μm or sub-μm range. Only by this means is further processing possible. Particular forms of processing here include on the one hand incorporation into a polymer, polymer electrolyte or polyelectrolyte for the final production of a hybrid electrolyte. Alternatively, the operation in question may be compression moulding or may be that of incorporation into a ceramic slip and further processing thereof in a shaping step (e.g. tape casting) to form a green ceramic body which by sintering is converted into a ceramic component ultimately consisting purely of the inorganic solid-state ion conductor.

Comminuting processes, such as said fine grinding processes, for example, make the production of spherical powder particles virtually impossible. Instead, they produce fragmentary particles, featuring edges and angles. These particles, accordingly, have a sphericity of significantly less than 0.7.

In many applications, non-spherical particles of a single material are much more difficult to process than their spherical pendants, assuming the same particle size and particle-size distribution. This circumstance is manifested in particular on incorporation into thermoplastic matrices (as in the case of production of hybrid electrolytes for example) and into liquid matrices (relevant, for example, in the case of the production of ceramic slips). For the same volume fill levels, the viscosity of the particle-filled formulation is significantly higher in the case where non-spherical particles are used than for the use of spherical particles of the same material, provided the latter possess a comparative particle size and/or particle-size distribution.

Conversely, in the case of the spherical variant, such formulations can be provided with significantly higher fill levels than in the case of the non-spherical embodiment. The reason for this is that the internal friction in formulations filled with non-spherical particles is increased by the tendency of the particles to get caught up with one another when they move past one another within the formulation as a result of the action of external shearing forces. In the case of spherical particles, in contrast, they are better able to slide past one another.

The capacity to achieve much higher volume fill levels under comparable conditions when using spherical particles in formulations filled therewith is of great relevance in practice: in hybrid electrolytes, for example, as a result of increased incorporation of the solid-state inorganic ion conductor, consisting of spherical particles, it is possible to achieve much better lithium-ion conductivities, because the lithium-ion conductivity of the inorganic constituent is generally higher than that of the polymer-based matrix. Even at relatively high fill levels, ceramic slips remain pourable if spherical particles are employed in their formulation. The green body resulting after drying of the solvent subsequently has a much lower porosity, leading to significantly less contraction in the final sintering step. Artefacts frequently associated with contraction during sintering (such as cracking, for example, etc.) can be reduced significantly in their effect in this way.

In view of the prior art, therefore, the desire is for pulverulent, lithium-ion-conducting, solid electrolyte materials which consist of microscale or sub-microscale particles having a high sphericity $\Psi$.

By way of example, the following processes will be recited:

GLASS SPHERE PRODUCTION: the path to producing particles from lithium-ion-conducting material makes use of the fact that one of the ways in which these materials can be produced is via the glass-ceramic route: for this purpose, in a commonplace melting process, a green glass—which ideally is crystal-free—is first melted, and in the course of a downstream heating step is ceramicized and at the same time converted into the actual glass-ceramic. During cooling, the glass melt produced in the first process step may in principle be subjected to the customary hot shaping processes employed for the production of glass spheres. For this purpose, the following process approaches are conceivable: in the process disclosed in U.S. Pat. No. 3,499,745, a molten glass jet is caused to impinge on a striking wheel which, when sufficiently high forces are realized, causes the glass jet to break up into component strands, referred to as filaments. These filaments are subsequently spun first through a heated region, a cooling region, and finally into a collection zone. Because of the tendency to minimize the surface tension, this tendency taking effect after the formation of filaments, the filaments become round. According to EP 1 135 343 B1, a sufficient sphericity is achieved when the relaxation time T elapsing from the time of filament formation can be described by the equation $T=(d\times\mu)/6$. In this equation, d is the diameter of the spheres formed, L is the viscosity of the filament and 6 is the surface tension of the filament during the relaxation time. As described in U.S. Pat. No. 3,495,961, the striking wheel may also be replaced by a rotor. Other known processes for producing the glass spheres include the inflation of a burning gas stream through a molten glass stream in order to divide up the glass into individual particles. Such processes are disclosed in U.S. Pat. No. 3,279,905. For this purpose, alternatively, glass particles of relatively low sphericity may be (partially) melted again, as described in DD 282 675 A5, by being introduced into a flame, whereupon they undergo rounding.

FILAMENTIZATION OF SALT MELTS: In analogy to the filament formation described above and to the subsequent formation of spherical drops from a molten glass jet, owing to relaxation effects for reducing the surface energy, this process may take place correspondingly from a jet of material generated from a salt melt. In technological terms, it is possible here to proceed similarly, bearing in mind that the viscosity of a molten glass may differ considerably from that of a salt melt, according to the temperature selected in the respective case. The material in droplet form must be converted first of all—by passage through an even hotter region—into a pre-ceramic intermediate, which is frequently porous but, apart from isotropic contraction, is dimensionally stable—and must subsequently be converted further—either still in the same heating step or in a separate, additional, downstream heating step—into the actual solid-state lithium-ion conductor. In this way, ideally, densely sintered spheres of the solid-state lithium-ion conductor material are obtained.

SPRAY CALCINATION (USING THE PULSATION REACTOR TECHNOLOGY): When using a pulsation reactor, as disclosed in DE 10111938 A1, DE 102006027133 A1, DE 102006039462 A1 or EP 1927394 A1, a gaseous or a liquid mixture in the form of a solution, suspension or dispersion comprising all the components for producing the lithium-ion-conducting material is introduced into a pulsating stream of hot gas—in the latter case, by fine atomization. The pulsating stream of hot gas itself is generated within a hot gas generator in the reactor, through the combustion of natural gas or hydrogen with ambient air. Depending on the position chosen for sprayed introduction, the temperatures prevailing there are between 500 and 1500° C. Within the pulsating stream of hot gas, an intermediate is formed which, by further thermal aftertreatment in the same reactor or in a different reactor, is converted into the ultimate form. In the former case, the reactor may be provided with an additional fuel supply, which is positioned downstream of the point of spray introduction, along the pulsating stream of hot gas.

DROPLET FORMATION PROCESS: In the case of the droplet formation process, the starting point is an aqueous or solvent-based salt solution or a sol as precursor for the lithium-ion-conducting material, or else a nanoparticulate solution of the lithium-ion-conducting material, and the sol or solution is converted into droplets via a suitable nozzle apparatus. After they have been formed, the droplets either are dried directly in a suitable process gas stream, as described in U.S. Pat. No. 4,043,507 or 5,500,162, or else first, by introduction into a suitable liquid medium, as disclosed in U.S. Pat. Nos. 5,484,559, 6,197,073, US 2004/0007789 A1 or WO 2015/014930 A1, are first stimulated to further flocculation and subsequently are aged, washed and dried. The spherical, porous green bodies produced in this way undergo a subsequent sintering step in which they are compacted to form a lithium-ion-conducting ceramic body with high sphericity.

The object is achieved, moreover, by a process for producing a lithium-ion conductor, in which the composite material of the invention is sintered, more particularly under the action of elevated temperature and/or elevated pressure.

DETAILED DESCRIPTION

According to requirements and field of use, both the lithium-ion-conducting composite material of the invention and a lithium-ion conductor produced from the lithium-ion-conducting composite material may be used as a lithium-ion-conducting component or constituent of such a component.

Further described are formulations for producing composite precursors for hybrid electrolytes or ceramic slips for producing sintered, purely inorganic, solid-state lithium-ion conductor components, in which, at the same volume fill levels, the viscosity of the particle-filled formulation when using non-spherical particles is significantly higher than when using the particles of high sphericity $\Psi$ used in accordance with the invention, provided that particle size and/or particle-size distribution are the same in both cases.

Moreover, formulations for producing composite precursors for hybrid electrolytes or ceramic slips for producing sintered, purely inorganic, solid-state lithium-ion conductor components are described in which the corresponding formulations, without substantial change in the viscosity, can be provided with significantly higher fill levels in the case of the spherical variant than in the case of the non-spherical embodiment. The proviso in this case again is that in both cases there are no substantial differences in particle size and particle-size distribution.

The lithium-ion-conducting material produced in accordance with the invention in the form of spherical particles with size in the μm- or sub-μm range may be incorporated as filler into a polymer electrolyte or into polyelectrolytes, in which case the resulting composite is popularly referred to as a hybrid electrolyte. Alternatively to this, it may be compressed to a compact using suitable tooling, or incorporated into a ceramic slip (with or without the addition of a binder), and subjected to a suitable shaping process (e.g. tape casting), and in both cases may be sintered at temperature to form a purely inorganic, ion-conducting moulding. Both forms of presentation—hybrid electrolyte and purely inorganic, ceramic, solid-state ion conductor—may be used as solid-state electrolytes in next-generation rechargeable lithium or lithium-ion batteries, as for example in solid-state lithium batteries (all-solid-state batteries (ASSB)) or lithium-air batteries. One possibility is the use thereof as a separator introduced between the electrodes, it preserves them from unwanted short-circuiting and so ensures the functional capacity of the system as a whole. For this purpose, the corresponding composite may either be applied as a layer to one or both electrodes or integrated as a self-standing membrane, in the form of a solid-state electrolyte, into the battery. An alternative possibility is that of compounding with the active electrode materials—in the case of the hybrid electrolyte, by incorporation on the active electrode material into the hybrid electrolyte formulation; in the case of the purely inorganically ceramic electrolyte, by co-sintering with that electrolyte. In this case, the solid-state electrolyte brings about the transport of the relevant charge carriers (lithium ions and electrons) to the electrode materials and to or away from the conducting electrodes, according to whether the battery is being discharged or charged.

WORKING EXAMPLES

Examples of production of lithium-ion-conducting particles of high sphericity $\Psi$ of at least 0.7 from a lithium-ion-conducting material:

Production of Spherical LAGP Particles

Shaping Directly from the Green Glass Melt

A starting glass for an eventually lithium-ion-conducting, phosphate-based glass-ceramic of the composition 5.7 wt % $Li_2O$, 6.1 wt % $Al_2O_3$, 37.4 wt % $GeO_2$ and 50.8 wt % $P_2O_5$ was melted in a discharge crucible at a temperature of 1650° C.

In the melting assembly selected, the glass melt was held at a temperature of 1600° C. It was discharged from a nozzle with a diameter of 2 mm, positioned on the base of the crucible. The glass jet thus produced was dropped onto a 53-toothed striking wheel 8 mm thick and with an outer diameter of 135 mm, this wheel rotating at a frequency of 5000 rpm about its own axis. In this way, the glass stream was filamentized into individual sub-strands, and accelerated with an angle of inclination of between 20 to 300 as measured with respect to the horizontal. It was subsequently passed through a tubular furnace 3 m long, constructed in a curved shape and heated to 1550° C. with two gas burners, this furnace mimicking the flight path of the filamentized glass stream. As a result of the tendency to minimize the surface energy, the filaments in elongate form underwent a change in shape to spheres. Following emergence from the tubular furnace, the glass spheres were cooled by further flight in air until sufficient dimensional stability was achieved, and were finally captured in a collecting vessel.

The cooled, very largely X-ray-amorphous green glass spheres produced by the hot shaping process described were ceramicized and so converted into the eventual, lithium-ion-conducting glass-ceramic in the course of a further temperature treatment after nucleation in the temperature range between 500 and 600° C. for 2 to 4 hours with a maximum temperature of 850° C. and a hold time of 12 hours.

Shaping by Rounding of Non-Spherical Green Glass Particles

A starting glass for an eventually lithium-ion-conducting, phosphate-based glass-ceramic of the composition 5.7 wt % $Li_2O$, 6.1 wt % $Al_2O_3$, 37.4 wt % $GeO_2$ and 50.8 wt % $P_2O_5$ was melted in a discharge crucible at a temperature of 1650° C.

In the melting assembly selected, the glass melt was held at a temperature of 1600° C. It was discharged from a nozzle with a diameter of 2 mm, positioned on the base of the crucible into a nip between two contra-rotating, water-cooled rolls, where it was quenched to form a green glass ribbon. The green glass ribbon was singularized into small splinters mechanically, using a hammer.

The glass splinters were roughly comminuted by preliminary grinding in a bead mill, and the powder fraction having a particle size $d_{100}$<100 μm was removed by sieving from this roughly comminuted material. This green glass powder isolated by sieving was comminuted further in an additional downstream step of dry grinding in an opposed-jet mill to a particle size with a distribution of $d_{10}$=0.9 μm, $d_{50}$=5 μm, $d_{90}$=13 μm and $d_{99}$=18 μm.

By introduction of the powder into an oxyhydrogen gas flame, the glass particles are melted again, and experience rounding in the process, owing to the tendency for minimization of the surface energy. On emergence from the flame, the particles are allowed to cool and are captured in a collecting vessel.

The cooled, very largely X-ray-amorphous green glass spheres produced by the hot shaping process described were ceramicized and so converted into the eventual, lithium-ion-conducting glass-ceramic in the course of a further temperature treatment after nucleation in the temperature range between 500 and 600° C. for 2 to 4 hours with a maximum temperature of 850° C. and a hold time of 12 hours.

Filamentization of Salt Melts

In a first step, a zirconium-containing precursor powder was produced as follows: 23.4 kg (50.0 mol) of zirconium n-propoxide (70% solution) are admixed dropwise with 5.0 kg (50.0 mol) of acetylacetone with stirring in a round-bottomed flask. The resulting reaction mixture is stirred at room temperature for 60 minutes. Then 2.7 kg (150.0 mol) of distilled water were added for hydrolysis. After a reaction time of about 1 hour, the resulting prehydrolysate was dried completely on a rotary evaporator. A sample of the resultant powder is then heated to determine the oxide content (900° C./5 hours).

1.77 kg (5.0 mol) $ZrO_2$ equivalent of the zirconium-containing precursor powder (oxide content: 35 wt %) produced in the preceding step were introduced together with 2.5 kg (7.5 mol) of lanthanum acetate sesquihydrate, 1.95 kg (19.2 mol) of lithium acetate dihydrate and 0.15 kg (0.61 mol) of aluminium chloride hexahydrate into a ball mill, where they were ground for 4 hours to produce an ideally homogeneous powder mixture. The grinding balls used for this purpose were $Al_2O_3$ balls with a diameter of 40 mm.

After sieving to remove the balls, the powder mixture was placed into an $Al_2O_3$ discharge crucible where it was brought to a temperature of 300° C., just above the melting point of anhydrous lithium acetate, which is 280-285° C. A salt melt is formed which was discharged via a nozzle with a diameter of 2 mm that was positioned on the base of the crucible. The jet generated in this way and consisting of the salt melt was dropped onto a 53-toothed striking wheel 8 mm thick with an outer diameter of 135 mm, this wheel rotating at a frequency of 5000 rpm about its own axis. In this way, the jet consisting of the salt melt was filamentized into individual strands and accelerated with an angle of inclination of between 20 to 300 as measured with respect to the horizontal. It was subsequently passed through a tubular furnace 3 m long and of curved construction that mimicked the flight path of the filamentized jet consisting of the salt melt. The furnace was heated electrically so as to be maintained in the entry zone at moderate temperatures of 300-320° C., so that the salt melt was retained and the filaments, initially still of elongate form, underwent a change in shape, owing to the tendency for minimization of the surface energy, into spheres which are still liquid. In the downstream zones, the temperature selected was then significantly higher—temperatures of around 900° C. were achieved here. Here, therefore, there was a first step of calcination of the liquid spheres, forming porous, preceramic particles as an intermediate. Following emergence from the tubular furnace, these spheres were allowed to cool by further flight in air and were finally captured in a collecting vessel.

The porous, preceramic particles were compacted in a further calcination step in an oven at 1050° C. with a hold time of 7-8 hours to give the final spheres consisting of the lithium-ion-conducting LLZO material.

Production of Spherical LLZO Particles Via Spray Calcination Using the Pulsation Reactor Method 2.3 kg (4.7 mol) of zirconium acetylacetonate were dissolved in at least 10.0 kg (556 mol) of distilled water in a suitable reaction vessel. 2.4 kg (7 mol) of lanthanum acetate sesquihydrate were dissolved in a further reaction vessel in 10 kg (556 mol) of distilled water. 1.8 kg (18 mol) of lithium acetate dihydrate and 0.14 kg (0.58 mol) of aluminium chloride hexahydrate were dissolved in a third reaction vessel in 5.0 kg (278 mol) of distilled water. After complete dissolution of the components, the solutions were combined and the resulting reaction mixture was stirred at room temperature for 12 hours.

The solution is conveyed with the aid of a peristaltic pump into a pulsation reactor at a volume flow rate of 3 kg/h, where via a 1.8 mm titanium nozzle it is finely atomized into the reactor interior, where it is subjected to thermal treatment. The temperature of the combustion chamber here is maintained at 1030° C., and that of the resonance tube at 1136° C. The ratio of the quantity of combustion air to the quantity of fuel (natural gas) is 10:1 (airgas).

The powder is introduced into a cuboidal alpha-alumina crucible and placed in a chamber kiln. The material for calcining is brought to a temperature of 1050° C. in the kiln, in an air atmosphere, for the complete compaction of the spherical microscale particles consisting of the LLZO.

Production of Spherical LLZO Particles Via the Droplet Formation Process

The LLZO material was first of all melted in a so-called skull crucible, as described in DE 199 39 782 C1, for instance. Employed for this purpose was a water-cooled crucible in which, during melting, a cooler protective layer of the material to be melted is formed. Accordingly, no crucible material is dissolved during the melting operation. The input of energy into the melt is accomplished by means of radio-frequency coupling via the surrounding induction coil into the molten material. A condition here is the sufficient conductivity of the melt, which in the case of lithium garnet melts is assured by the high lithium content. During the melting process, evaporation of lithium occurs, and can easily be corrected by an excess of lithium. For this purpose it is normal to operate with a 1.1- to 2-fold lithium excess.

The raw materials were mixed in accordance with the following composition and introduced into the skull crucible, which is open at the top: 14.65 wt % $Li_2O$, 56.37 wt % $La_2O_3$, 21.32 wt % $ZrO_2$ and 7.66 wt % $Nb_2O_5$. It was necessary first of all to preheat the batch in order to achieve a certain minimum conductivity. This was done using a burner heating system. When the coupling temperature was reached, further heating and homogenization of the melt were achieved via radio-frequency coupling via the induction coil. In order to improve the homogenization of the melts, stirring took place with a water-cooled stirrer.

The material produced in this way may in principle be converted, either by direct solidification from the melt or by quenching, followed by a temperature treatment (ceramicization) into a glass-ceramic material with a garnet-like main crystal phase. In the example described here, the variant selected was that of direct quenching.

In this case, the material was obtained as a monolithic block, which was converted into a powder having a particle size $d_{100}$<100 μm via a variety of rough comminution processes—such as processing with hammer and chisel in the first step, comminution of the fragments obtainable in that case, using a jaw crusher in the second step, and further preliminary grinding of the resultant coarse powder in the planetary mill, with subsequent sieving, in the third step. In a further downstream step, this powder was comminuted further by grinding in water, this being carried out in an attritor, to a particle size having a distribution of $d_{10}=0.14$ μm, $d_{50}=0.42$ μm, $d_{90}=1.87$ μm and $d_{99}=2.92$ μm. The content of LLZO solids in the grinding slip used in this case was around 30%. To stabilize the particles, a dispersant (Dolapix CE 64 or Dolapix A88 from Zschimmer & Schwarz GmbH & Co. KG) was added to the slip prior to grinding, with a fraction of 1.0%, based on the LLZO fraction in the suspension, proving to be highly practicable.

For further processing, the solids content of the grinding slip was increased to a level of 60% by partial evaporation of the water on the rotary evaporator, to obtain a suitable mixing ratio in respect of the viscosity.

Then ammonium alginate was added as a binder in an amount of 1.0%.

By means of a droplet formation process involving nozzles and/or hollow needles, dimensionally stable green bodies with sizes of 0.3 to 2.5 mm were obtained from the slip by immersion and also reaction in an aluminium lactate solution or an inorganic acid solution or an organic acid solution.

These green bodies were subsequently shaped to form sintered beads by a sintering process. Sintering took place in an air atmosphere under standard pressure at temperatures of 1150° C.

Examples for the production of formulations of lithium-ion-conducting composite materials filled with at least 20 vol % of lithium-ion-conducting particles with high sphericity Ψ of at least 0.7 from a lithium-ion-conducting material with a polydispersity index PI of the particle size distribution of <0.7, or at least 30 vol % of corresponding particles at a polydispersity index PI of the particle size distribution of 0.7<PI<1.2, or at least 40 vol % of corresponding particles at a polydispersity index PI of the particle size distribution of >1.2.

Production of a composite material of the invention (production of a hybrid electrolyte membrane based on a polyethylene oxide (PEO) filled with LLZO particles/lithium bis(trifluoromethanesulfonyl)imide (LiTSFI) polymer electrolyte).

1.4 g of polyethylene oxide (PEO, Dow Chemical) having a molar weight of $4 \times 10^6$ g/mol were dried under reduced pressure at 50° C. for 48 hours. Added to the polymer under dry room conditions (dew point <−70° C.) were 8.5 g of lithium lanthanum zirconium oxide powder, consisting of particles having a sphericity of 0.92 and a particle size distribution as follows: $d_{10}=1.22$ μm, $d_{50}=2.77$ μm, $d_{90}=5.85$ μm $d_{99}=9.01$ μm. Correspondingly, in accordance with the invention, the polydispersity index PI of the particle size distribution is 0.681. The mixture was subjected to intensive grinding in a mortar. It was then admixed with 0.6 g of lithium bis(trifluoromethanesulfonyl)imide (LiTFSI, 3M) having a purity of >99% (suitable for battery applications), which had been dried beforehand under reduced pressure ($10^{-7}$ bar) at 120° C. for 24 hours. All of the components were further mixed intensely in the mortar, to form, finally, a homogeneous paste. This resulted in a PEO/LiTSFI polymer electrolyte matrix having a ratio of lithium ions to ethylene oxide monomer units (Li:EO) of 1:15, in which the inorganic solid-state lithium-ion conductor was embedded in a volume fraction of 50 vol %. The hybrid electrolyte thus produced was vacuum-welded into a pouch, heat-treated overnight at 100° C. and then subjected to hot pressing at 100° C. with an applied force of 50 kN (50-750 kg/cm²) (Servitec Polystat 200 T press). This gave a composite membrane having a thickness of around 100 μm.

The same procedure was used to produce hybrid electrolyte membranes, using an LLZO powder consisting of non-spherical particles (Ψ=0.48), the particle size distribution being as follows: $d_{10}=0.44$ μm, $d_{50}=1.24$ μm, $d_{90}=3.50$ μm, $d_{99}=6.94$ μm. The polydispersity index of the particle size distribution, PI, was in this case, in accordance with the invention, 0.900. In these cases, however, only 4.6 g of LLZO powder could be incorporated practicably into the pEO/LiTSFI polymer electrolyte matrix; in these cases, in other words, the hybrid electrolyte was producible only with a maximum volume content of 29 vol %.

Production of a lithium-ion conductor of the invention from the composite material of the invention (production of a purely inorganic, sintered solid-state electrolyte membrane by means of a tapecasting process, based on a casting slip filled with LATP particles)

11.4 g of polyvinyl butyral (PVB) having a molar weight of 35 000 g/mol, containing the vinyl butyral units and also 1.7 wt % of vinyl acetate and 18.9 wt % of vinyl alcohol units, were dissolved in 68.4 g of a solvent mixture consisting of ethanol and toluene (4:6). The viscosity of the solution was between 200 and 450 mPa s. The mixture was admixed with 5.7 g of dioctyl phthalate, which functioned as a plasticizer. Introduced finally into the mixture by dispersion, using a dissolver, were 200 g of a lithium aluminium titanium phosphate (LATP) glass-ceramic powder, which consisted of particles having a sphericity of 0.94 and a particle size distribution as follows: $d_{10}=0.81$ μm, $d_{50}=2.23$ μm, $d_{90}=5.17$ μm, $d_{99}=8.46$ μm. In accordance with the invention, the polydispersity index PI of the particle size distribution in this case was 0.805. The resulting casting compound had a viscosity of 4000-5000 mPa s. The glass-ceramic powder content was around 43 vol %.

The homogenized compound produced in this way was subsequently freed from gas bubbles (i.e. deaerated) by means of vacuum technology. This deaerated material was supplied to the customary tapecasting process on a film-drawing apparatus, and in that way was cast into a tape with a thickness (measured after drying) of around 0.3 mm. The green tape produced in this way was thereafter cut to the desired format and so singularized.

The singularized tape sections were finally sintered at 1000° C. for 4 hours to form dense LATP membranes. Tape shrinkage in this process was around 9%.

In accordance with the same procedure, a purely inorganic solid-state lithium-ion conductor membrane was produced, using an LATP powder which consisted of non-spherical particles (Ψ=0.46) and had a particle size distribution as follows: $d_{10}=0.68$ μm, $d_{50}=1.74$ μm, $d_{90}=3.86$ μm, $d_{99}=7.21$ μm. The polydispersity index of the particle size distribution, PI, was in this case 0.754, in accordance with the invention. In these cases, however, it was possible for only 90 g of LATP powder to be incorporated practicably into the binder solution consisting of PVB, dioctyl phthalate and ethanol/toluene, meaning that in these cases the tapecasting slip could only be produced with a volume content of max. 28 vol % without significantly exceeding the target viscosity of 4000-5000 mPa s. On account of the significantly reduced solids content, the contraction during sintering was around 15%.

What is claimed is:

1. A lithium-ion-conducting composite material, comprising:
    a polymer selected from the group consisting of polyethylene oxide, derivatives of polyethylene oxide, polyvinyl butyral, and combinations thereof; and
    lithium-ion-conducting particles having a sphericity Ψ of at least 0.7, wherein the lithium-ion-conducting particles comprise a lithium-ion-conducting compound selected from the group consisting of lithium lanthanum zirconate (LLZO), lithium aluminum titanium phosphate (LATP), and combinations thereof, wherein the lithium-ion-conducting particles have a polydispersity index of at least 0.7 and are present in at least 30 vol % of the composite material, and wherein the lithium-ion-conducting particles have an average particle diameter of 0.02 μm to 100 μm.

2. The lithium-ion-conducting composite material of claim 1, wherein the lithium-ion-conducting particles have an average particle diameter of 0.2 μm to 2 μm.

3. The lithium-ion-conducting composite material of claim 1, wherein the lithium-ion-conducting particles have an average particle diameter of 5 μm to 70 μm.

4. The lithium-ion-conducting composite material of claim 1, wherein the lithium-ion-conducting particles are spray calcination particles.

5. The lithium-ion-conducting composite material of claim 4, wherein the lithium-ion-conducting particles are pulsation reactor particles.

6. A lithium-ion-conducting composite material, comprising:
 a polymer selected from the group consisting of polyethylene oxide, derivatives of polyethylene oxide, polyvinyl butyral, and combinations thereof; and
 lithium-ion-conducting particles having a sphericity $\Psi$ of at least 0.9, wherein the lithium-ion-conducting particles comprise a lithium-ion-conducting compound selected from the group consisting of lithium lanthanum zirconate (LLZO), lithium aluminum titanium phosphate (LATP), and combinations thereof, and
 wherein the lithium-ion-conducting particles have a polydispersity index of >1.2 and are present in at least 40 vol % of the composite material, and
 wherein the lithium-ion-conducting particles have an average particle diameter of 0.02 μm to 100 μm.

7. The lithium-ion-conducting composite material of claim 1, wherein the lithium-ion-conducting particles have a sphericity $\Psi$ of at least 0.9.

8. The lithium-ion-conducting composite material of claim 1, wherein the lithium-ion-conducting particles have a polydispersity index of >1.2 and are present in least 40 vol % of the composite material.

* * * * *